C. SAVINO.
MOTOR.
APPLICATION FILED AUG. 30, 1920.

1,375,018.

Patented Apr. 19, 1921.
2 SHEETS—SHEET 1.

Camillo Savino INVENTOR.

BY

*Oscar A. Geier*
ATTORNEY.

C. SAVINO.
MOTOR.
APPLICATION FILED AUG. 30, 1920.
1,375,018.
Patented Apr. 19, 1921.
2 SHEETS—SHEET 2.
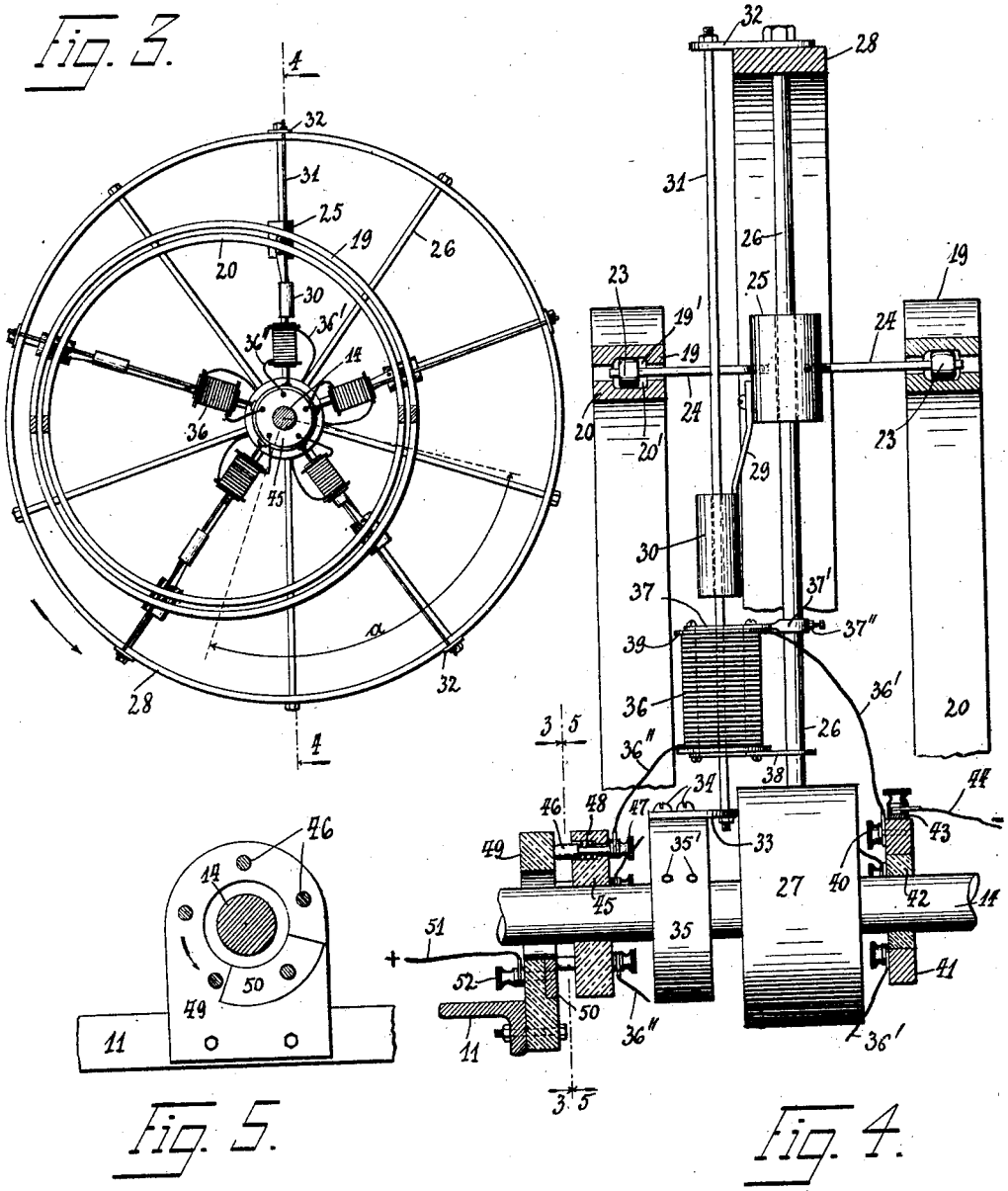
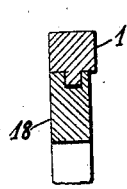
INVENTOR.
Camillo Savino
BY
Omar A. Geier
ATTORNEY.

UNITED STATES PATENT OFFICE.

CAMILLO SAVINO, OF NEW YORK, N. Y.

MOTOR.

1,375,018.  Specification of Letters Patent.  Patented Apr. 19, 1921.

Application filed August 30, 1920. Serial No. 407,053.

*To all whom it may concern:*

Be it known that I, CAMILLO SAVINO, a subject of the King of Italy, residing at New York, county of New York, and State of New York, have invented certain new and useful Improvements in Motors, of which the following is a specification.

My invention relates to motors of the type in which weights moving toward and from the center of a wheel or rotor cause said wheel to turn by a preponderance of gravity on one side of the center. In my present machine, I have provided improved means for shifting the weights at the proper times automatically, and also for varying the velocity of rotation.

The advantages and structural features of my invention will now be described in detail with reference to the accompanying drawings, which represent a preferred and satisfactory form of the machine, but I desire it to be understood that various modifications may be made without departing from the nature of my invention as set forth in the appended claims.

Figure 1:
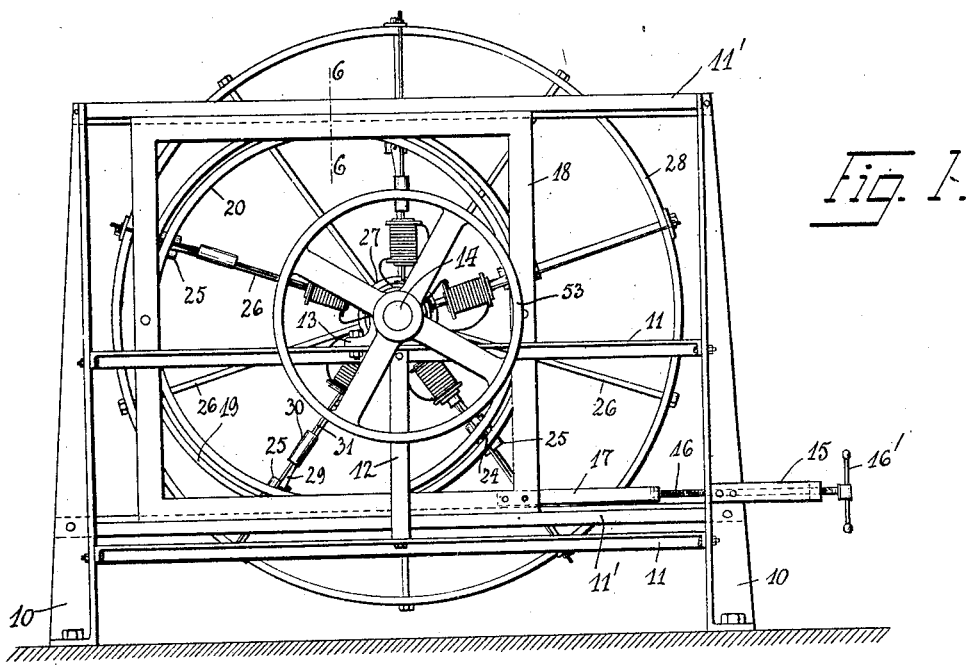
Figure 2:
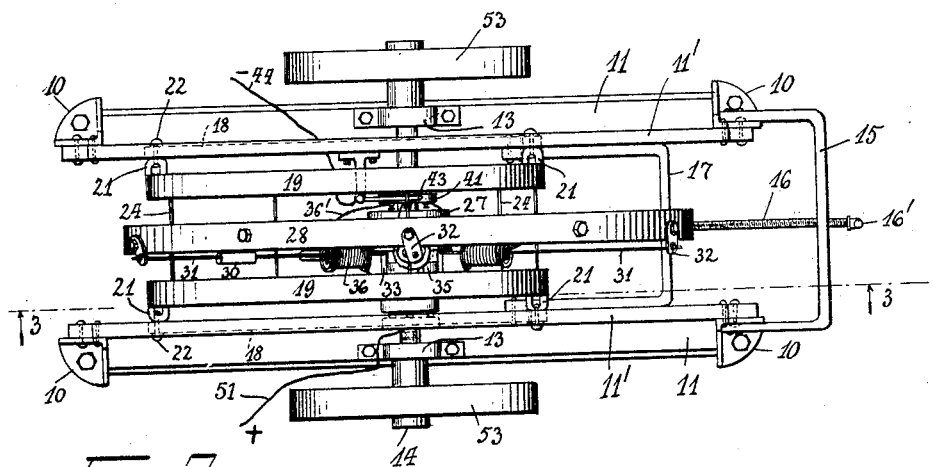

In the said drawing, Figure 1 is a side elevation of the improved motor; Fig. 2 is a plan view thereof; Fig. 3 is a vertical section on line 3—3 of Figs. 2 and 4, with parts omitted; Fig. 4 is an enlarged vertical section on line 4—4 of Fig. 3; Fig. 5 is a detail vertical section in line 5—5 of Fig. 4; and Fig. 6 is a detail vertical section on line 6—6 of Fig. 1.

In the example illustrated, the stationary frame of the machine comprises four standards 10 arranged in pairs and anchored to a suitable support, the standards of the same pair being connected by braces 11 and by parallel guide members 11'. The two braces of the same pair are connected by an upright 12 to better support a bearing 13, the main shaft 14 being journaled in the two alining bearings 13. A U-shaped horizontal cross member 15 connects two standards 10 of different pairs, and is provided at its center with a horizontal screw threaded opening in threaded engagement with a screw 16, provided with a handle 16' at its outer end. The inner end of said screw is connected with a U-shaped member 17 in such a manner that the screw may turn freely relatively thereto (without threaded engagement) but that any longitudinal motion will be shared in unison by said screw and by the member 17. The parallel ends of the members 17 are secured rigidly to frames 18 adapted to slide along the guide members 11'. With said frames are connected rigidly two like cam tracks which in the particular construction shown are of circular shape, but I do not wish to restrict myself to this feature. Each of the cam tracks illustrated comprises two concentric rings, 19 and 20, which may be grooved on their opposing faces as indicated at 19' and 20' respectively. Any suitable means may be employed for securing these rings to the frames 18; for instance, the two rings may be connected rigidly with each other, say at two diametrically-opposite points, by means of laterally-extended bows or stirrups 21, the central portion of which are fastened to the frames 18 rigidly, as by means of rivets 22. The center or axis of the rings 19, 20 is parallel to the shaft 14 and so arranged that by moving the frame 18 lengthwise of the guides 11', said center or axis may be made to coincide with the shaft axis, or brought to different eccentric positions.

The trackings 19, 20 are spaced as shown, and in their opposing surfaces are adapted to travel carriages or engaging members of any suitable construction. For instance, as illustrated, rollers 23 may run in the grooves 19', 20', said rollers being mounted to turn on axle pins 24, the said pins preferably alining in pairs and being secured to weights 25 adapted to slide along some of the spokes 26 of a wheel held to turn with the shaft 14, said wheel comprising a hub 27, the spokes 26, and a rim 28 constituting a fly-weight. With each weight 25 is connected to move in the same direction, as by means of an attaching arm 29 a core 30 of magnetizable material, such core being adapted to slide along a rod 31 parallel to the corresponding spoke 26. The outer end of the rod 31 is shown secured to a bracket arm 32 fastened to the rim 28, and the inner end of the rod 31 is secured to an arm 33 fastened by screws 34 to a hub or collar 35 rotating with the shaft 14; only one of the arms 33 is shown in Fig. 4, and 35' indicates the threaded holes in the collar 35 to receive the ends of the screws 34.

Each of the cores 30 is adapted to be attached by a solenoid coil 36 co-axial with the respective rod 31, and maintained in such position in any suitable manner, as by means of brackets 37, 38 extending from the coil carrier 39 to the adjacent spoke 26; the bracket 38 may simply have a hole through which the spoke extends, while the bracket 37 may have a strap 37' surrounding the spoke and secured thereto rigidly, say by a set screw 37''. It will be understood that after loosening the set screw, the coil 36 may be adjusted by sliding it in or out along the spoke 26.

The electrical connections may be as follows: one end, 36', of each coil 36 is connected permanently with one pole of a suitable source of electricity (direct current), for instance by attaching said wire end by means of a binding nut 40 to a conducting collar 41 held to rotate with the shaft 14 but insulated therefrom, as at 42; the collar is in permanent contact with a suitably supported stationary brush 43 connected with one of the current-supplying wires, 44. The other ends, 36'' of the several coils 36 are connected individually with suitable contact-making parts, insulated from each other, and included in the circuit at certain times only. For instance, an insulating disk 45 held to rotate with the shaft 14, may be provided with perforations (at equal distances apart) parallel to the shaft 14 and receiving sliding contact members 46 each having the respective coil end 36'' attached thereto by a binding nut 47 and each provided with an enlargement or head which a coil spring 48 tends to force away from the carrier disk 45. The free ends of these members or pins 46 engage the adjacent surface of a stationary insulating plate 49 (say, secured to one of the braces 11) and of a metal sector 50 countersunk in said plate so as to be flush therewith. The other pole of the source of electricity is suitably connected with said sector, say by a wire 51 and a binding nut 52.

At 53 I have indicated pulleys secured to the shaft 14 rigidly, to receive belts for the transmission of power to driven devices.

The operation is as follows: The slides 18 having been adjusted by means of the screw 16 to bring the cam tracks 19, 20 to a position eccentric with the shaft 14, for instance as shown in Figs. 1 and 3, it will be seen that the cores 30 and the weights 25 are considerably farther from the center of the shaft or rotor on one side (the left) than on the other, and this preponderance of weight on one side of the shaft will cause the rotor to turn as indicated by the arrow in Figs. 3 and 5. When one of the pins 46 comes in contact with the conducting sector 50, at the left hand end thereof, a circuit is closed through one of the solenoid coils 36 as follows: from the wire 51 to binding post 52, conducting sector 50, contact pin 46, wire 36'', coil 36, wire 36', conducting collar 41, brush 43, and wire 44. This coil remains energized as long as the corresponding pin 46 is in contact with the sector 50. Preferably the circumferential extent of said sector is greater than the circumferential distance between two adjacent pins 46 (but smaller than twice this distance) so that for a short while two adjacent coils 36 will be energized, and at all times the circuit will be closed through at least one of said coils. The particular construction shown embodies a rotor with ten spokes 26, and weights 25, cores 30 and coils 36 adjacent to alternate spokes, but I do not wish to limit myself to this specific arrangement. While a coil 36 is energized, it will attract the corresponding core 30 and cause it to move inwardly along the guide rod 31. This movement has a double effect: First, it brings the weights 25 within the angle of the solenoid action (which angle, corresponding to the position and extent of the sector 50, is indicated at $a$ in Fig. 3), toward the center of the rotor, so that there is a preponderance of weight at the other side to turn the wheel by the action of those weights which are farthest from the center. Second, the inward pull of the core 30 is transmitted by the axle pins 24 to the rollers or carriages 23, which therefore will be drawn forcibly against the inner track ring 20, in a direction radial with respect to center of the shaft 14. Now it will be evident from Fig. 3 that such radial direction, within the angle of action $a$, is not normal to the track, but oblique relatively thereto, and the reaction of the oblique track portion to the radial inward pressure of the engaging member or roller 23 will therefore have a circumferential or tangential component tending to turn the rotor in the same direction (contra-clockwise in Fig. 3) as the weights 25. By this combined action of the weights and of the engaging members 23, a continuous rotation of the wheel and shaft is obtained. The coils 36 should be at equal distances from the shaft 14, and be adjusted in such a manner that the attraction of the core 30, by the coils 36 will always be inward, that is, at the moment the circuit is broken, the core 30 should not have passed inwardly beyond the neutral point to which the attraction of the coil 36 seeks to bring it. It will be evident that, in the case illustrated, the core 30 will reach the limit of its inward movement when it is in a horizontal position to the right of the shaft 14, and Fig. 3 therefore shows that the circuit is broken slightly before the core 30 reaches its innermost position. This arrangement is preferred for the reason that at this position the cam track is almost normal to the radial line of action of the engaging member 23, and the circumferential component of the track reaction is therefore very small, while the radial component or resistance is correspondingly large.

The eccentricity of the track 19, 20 may be varied by means of the adjusting screw 16. The drawings show a position of practically the maximum eccentricity. If the eccentricity is reduced slightly, the coils 36 may be left in the same position, but if a material reduction of the eccentricity is effected, it will be desirable to adjust all the coils 36 to a greater distance from the center of the rotor.

The form of the carriages or engaging members 23, of the stationary frame, of the slide and its adjusting mechanism, may be varied, and the track need not be of the special construction shown, comprising two concentric circular rings, but other forms may be used to produce similar effects. Of course, when the track is concentric with the shaft 14, there will be no rotation of the wheel.

I claim as my invention:

1. A motor of the character described, comprising a rotor, weights carried by said rotor and movable toward and from its center, a stationary cam track governing the position of said weights, and means, operating along a portion of said track which approaches the center of the rotor, for shifting said weights inwardly.

2. A motor of the character described, comprising a rotor, weights carried by said rotor and movable toward and from its center, a stationary cam track governing the position of said weights, electromagnetic means related to said weights, and a circuit-closing device for energizing said means to shift the weights inwardly.

3. A motor of the character described, comprising a rotor, weights carried by said rotor and movable toward and from its center, a stationary cam track governing the position of said weights, a core of magnetizable material connected with each of said weights, a solenoid coil for each core, carried by the rotor, and a circuit-closing device for energizing said coils successively as they reach a certain position, to shift said weights inwardly.

4. A motor of the character described, comprising a rotor made with radial spokes, weights slidable along said spokes, a stationary cam track governing the position of said weights, and means, operating on said weights along a cam portion which approaches the center of the rotor, for shifting said weights inwardly.

5. A motor of the character described, comprising a rotor made with radial spokes, weights slidable along said spokes, a stationary cam track governing the position of said weights, solenoid coils carried by said rotor, guide rods secured to the rotor and extending parallel to the respective spokes and axially through the respective coils, a core of magnetizable material connected with each of said weights and movable toward and from said coil, and a circuit-closing device for energizing said coils successively as they reach a certain position, to shift said cores and weights inwardly.

6. A motor of the character described, comprising a rotor, weights carried by said rotor and movable toward and from its center, a normally stationary cam track governing the position of said weights and the extent of their inward and outward movement, means for adjusting said cam to vary the stroke of the weights, and means, operating along a portion of said track which approaches the center of the rotor, for shifting said weights inwardly.

7. A motor of the character described, comprising a rotor, weights carried by said rotor and movable toward and from its center, a normally stationary cam track governing the position of said weights and the extent of their inward and outward movement, means for adjusting said cam to vary the stroke of the weights, a magnetizable core connected with each of said weights, a solenoid coil for each core, carried by the rotor and adjustable toward and from the center thereof, and a circuit-closing device for energizing said coils successively as they reach a certain position.

8. A motor of the character described, comprising a rotor, weights carried by said rotor and movable toward and from its center, a stationary cam track governing the position of said weights, and means, operating on said weights successively as they reach a certain position, for giving them a radial movement.

9. A motor of the character described, comprising a rotor, members carried by said rotor and movable toward and from its center, a cam track engaged by said members and governing their position, electromagnetic means, operatingly related to said track engaging members, and a circuit-closing device for energizing said means successively as said members reach a certain position on the cam track, to press said members against the track and turn the rotor by a reaction effect.

10. A motor of the character described, comprising a rotor, weights carried by said rotor and movable toward and from its center, alining axles extending from said weights in opposite directions, parallel to the axis of rotation, engaging members mounted on said axles, stationary cam tracks located on opposite sides of the rotor and engaged by said members, and means, operating on said weights successively as they reach a certain position, for giving them a radial movement.

In testimony whereof I have affixed my signature.

CAMILLO SAVINO.